United States Patent [19]

Badesha et al.

[11] Patent Number: 4,863,508
[45] Date of Patent: Sep. 5, 1989

[54] PROCESS FOR THE PREPARATION OF CHALCOGENIDE ALLOYS BY THE SOLUTION OXIDATION OF ALKALINE SELENIUM AND ALKALINE TELLURIUM COMPOUNDS

[75] Inventors: Santokh S. Badesha, Pittsford; Martin A. Abkowitz, Webster, both of N.Y.

[73] Assignee: Xerox Corporation, Stamford, Conn.

[21] Appl. No.: 103,322

[22] Filed: Oct. 1, 1987

[51] Int. Cl.$^4$ .................. C22C 1/00; C22C 28/00
[52] U.S. Cl. ........................ 75/0.5 A; 75/97 R; 75/121; 420/579; 420/590
[58] Field of Search ............ 75/0.5 A, 97 R, 108, 75/121; 420/579, 590; 423/508, 509, 510

[56] References Cited

U.S. PATENT DOCUMENTS

| | | | |
|---|---|---|---|
| 2,010,870 | 8/1985 | Lindblad | 423/510 |
| 3,091,516 | 5/1963 | Conn | 423/510 |
| 3,577,216 | 5/1971 | Weiss et al. | 23/50 |
| 4,371,393 | 2/1983 | Gleim et al. | 75/108 |
| 4,460,408 | 7/1984 | Badesha et al. | 75/0.5 R |
| 4,484,945 | 11/1984 | Badesha et al. | 75/0.5 A |
| 4,576,634 | 3/1986 | Badesha et al. | 75/0.5 A |

FOREIGN PATENT DOCUMENTS

| | | | |
|---|---|---|---|
| 0127357 | 12/1984 | European Pat. Off. | 423/510 |
| 133467 | of 1960 | U.S.S.R. | 75/121 |
| 440004 | 12/1935 | United Kingdom | 423/510 |
| 814852 | 6/1959 | United Kingdom | 423/510 |

OTHER PUBLICATIONS

Treatment of Electrolytic Copper Refinery Slimes; Journal of Metals, May 1950; vol. 188; pp. 764–777 Schloen et al.

*Primary Examiner*—L. Dewayne Rutledge
*Assistant Examiner*—David W. Schumaker

[57] ABSTRACT

Disclosed is a process for the preparation of chalcogenide alloys, particularly selenium tellurium alloys, of high purify wherein there is provided a solution mixture of the aforementioned compounds; and thereafter this mixture is subjected to a simultaneous oxidation reaction.

20 Claims, No Drawings

PROCESS FOR THE PREPARATION OF CHALCOGENIDE ALLOYS BY THE SOLUTION OXIDATION OF ALKALINE SELENIUM AND ALKALINE TELLURIUM COMPOUNDS

BACKGROUND OF THE INVENTION

This invention is generally directed to processes for the preparation of chalcogenide alloys, and more specifically the present invention is directed to the preparation of chalcogenide alloys in high purity by simultaneously oxidizing a solution of alkaline selenium and alkaline tellurium compounds. Accordingly, there is provided in accordance with the present invention a simple, high yield, economically attractive, low temperature process for the direct preparation of chalcogenide alloys of high purity. The resulting chalcogenide alloys are useful, for example, in the preparation of imaging members, particularly xerographic photoconductive members that can be incorporated into electrophotographicimaging processes.

The incorporation of selenium or selenium alloys into xerographic imaging members is well known. These members can be subjected to a uniform electrostatic charge for the purpose of sensitizing the surface of the photoconductive layer, followed by exposure of an image to activating electromagnetic radiation such as light, which selectively dissipates the charge in the illuminated areas of the photoconductive insulating member, and wherein a latent electrostatic image is formed in the nonilluminated areas. The resulting image may then be developed and rendered visible by depositing thereon a toner composition containing resin particles and pigment particles.

Many processes are known for the preparation of chalcogenide alloys, particularly selenium containing alloys including, for example, melt blending of the elemental substances such as selenium and arsenic in the proportions desired in the final alloy product. Thus, for example, there is disclosed in U.S. Patent 3,634,134 the preparation of arsenic-selenium alloys by blending. This method not only involves high temperatures, but in most instances, crystalline materials are not obtained. Further, in many instances depending on the process parameters, the desired alloy is not obtained; rather by following, for example, the melt blending process, there is obtained an unhomogeneous mixture of arsenic, selenium, and an arsenic selenium alloy. Additionally, in these processes, there must be selected for evaporation high purity arsenic and high purity selenium, that is 99.999 percent pure; and moreover processes for obtaining high purity arsenic and selenium precursors usually require high temperature distillations which are not desirable. A similar melt blending method for preparing selenium alloys is disclosed in U.S. Pat. No. 3,911,091.

Also, there is disclosed in U.S. Pat. No. 4,007,255 a process for preparing stable red amorphous selenium containing thallium by precipitating selenious acid with from about 10 parts per million to about 10,000 parts per million of thallium dioxide with hydrazine from a solution thereof, and methanol or ethanol containing not more than about 50 percent by weight of water at a temperature between about −20° C. and the freezing point of the solution wherein the resulting precipitate is maintained at a temperature of from about a −13° C. to about a −3° C. A similar teaching is present in U.S. Pat. No. 4,009,249 wherein stable red selenium is formulated.

Disclosed in U.S. Pat. No. 3,723,105 is a process for preparing a selenium-tellurium alloy by heating a mixture of selenium and tellurium containing 1 to 25 percent by weight of tellurium to a temperature not lower than 350° C. to melt the mixture, followed by cooling gradually the molten selenium and tellurium to around the melting point of the selenium tellurium alloy at a rate not higher than 100° C. per hour, and subsequently quenching to room temperature within 10 minutes.

Further, there is disclosed in U.S. Pat. No. 4,121,981 the preparation of a selenium alloy by, for example, electrochemically codepositing selenium and tellurium onto a substrate from a solution of their ions wherein the relative amount of alloy deposited on the cathode is controlled by the concentrations of the selenium and the tellurium in the electrolyte, and by other electrochemical conditions. Once the selenium tellurium layer deposited on the cathode has reached the desired thickness, deposition is discontinued and the cathode is removed.

Additionally, there is disclosed in U.S. Pat. No. 3,524,745 the preparation of an arsenic antimony selenium alloy by heating a mixture of these materials at a temperature of 600° C. for a period of several hours in a vacuum, followed by air cooling to room temperature. According to the teachings of this patent, the cooled alloy, depending on the initial composition, is completely polycrystalline, a mixture of crystalline and amorphous phases, or completely amorphous.

Furthermore, there is disclosed in U.S. Pat. No. 4,460,408, the disclosure of which is totally incorporated herein by reference, a process for the preparation of chalcogenide alloys of high purity by the simultaneous coreduction of the corresponding esters subsequent to isolation and purification. More specifically, there is disclosed in this patent a process for the preparation of chalcogenide alloys in high purity comprising providing pure esters of the desired chalcogens, and subsequently subjecting the mixture of pure esters to a coreduction reaction with, for example, hydrazine. Also of interest is the prior art referred to in this patent, reference for example columns 1 and 2 thereof. In the process of the present invention, isolated pure esters are not involved, rather a solution of the oxides are subjected to a cooxidation reaction.

In addition, there is illustrated in U.S. Pat. No. 4,484,945, the disclosure of which is totally incorporated herein by reference, the preparation of chalcogenide alloys in high purity, which comprises providing a solution mixture of oxides of the desired chalcogens, and subsequently subjecting this mixture to a simultaneous coreduction reaction.

Other patents of interest include 3,577,216, which discloses a process for the recovery of selenium (IV) wherein the metallic selenide is precipitated from a reaction medium subsequent to the utilization of the aforementioned selenium as a catalyst in the oxidation of organic compounds by an oxidizing agent; 4,576,634, which illustrates the process for the preparation of selenium tellurium alloys by a reduction of an acid mixture of selenium and tellurium solutions; and 4,484,945, which discloses the preparation of selenium alloys by the coreduction of the corresponding chalcogenide esters oxides.

Although the process as mentioned herein as well as others are suitable for their intended purposes, with the primary exception of the processes disclosed in the Xerox patents mentioned such as U.S. Pat. Nos. 4,576,634; 4,460,408; and 4,484,945, these processes require high temperatures and distillations. Further, in some instances the aforementioned processes result in selenium alloys which have differing electrical properties which is believed to be the result of inhomogeneities known to exist in nonequilibrium glasses. In addition, the prior art processes for preparing alloys with the exception of the processes disclosed in many of the Xerox patents mentioned are not economical. Therefore, there is a need for new processes for preparing chalcogenide alloys that are economically attractive, and wherein there results alloys of high purity. Also, there is a need for improved processes wherein chalcogenide alloys can be obtained in high purity by utilizing substantially similar process parameters and apparatuses. Further, there continues to be a need for improved processes for the preparation of high purity chalcogenide alloys wherein some of the reactants selected can be recycled. Moreover, there continues to be a need for improved processes for preparing chalcogenide alloys that are homogeneous, are of a crystalline form, and can be obtained in various proportions without using high temperature reaction conditions, and without isolating and purifying any resulting intermediates. There is also a need for processes wherein chalcogenide alloys such as selenium and tellurium intermediates are cooxidized from a $-2$ valency to a 0 valency. There are also a need for a simple improved process for the direct preparation of selenium tellurium alloys wherein a solution co-oxidation can be accomplished in an effective manner. There are also a need for processes for the preparation of chalcogenide alloys, particularly selenium tellurium alloys wherein substantially no environmental hazards are associated therewith. These and other needs can be satisfied in accordance with the process of the present invention wherein substantially homogeneous chalcogenide crystalline alloys are obtained by the solution oxidation of a mixture of alkaline selenium and alkaline tellurium compounds.

SUMMARY OF THE INVENTION

It is an object of the present invention to provide improved processes for the preparation of chalcogenide alloys with many of the above-noted advantages.

It is yet another object of the present invention to provide improved processes for the preparation of high purity chalcogenide alloys by simultaneously subjecting a solution mixture of alkaline selenium and alkaline tellurium compounds to an oxidation reaction.

Another object of the present invention resides in the provision of improved processes for the preparation of high purity chalcogenide alloys by subjecting a solution mixture of alkaline selenium and alkaline tellurium compounds to an oxidation reaction with, for example, hydrogen peroxide.

Furthermore, in another specific object of the present invention there are provided improved processes for the direct preparation of high purity alloys of selenium and tellurium by the oxidation of a solution mixture of a solution of potassium selenide and potassium telluride compounds.

In yet another object of the present invention there are provided processes for the preparation of high purity chalcogenide alloys, which process is simple, economically attractive, presents no significant environmental pollution problems, can be affected at low temperatures, and results in the production of high yields of alloys.

A further object of the present invention is the provision of improved processes for the direct preparation of selenium tellurium alloys by the solution oxidation of alkaline selenium and alkaline tellurium compounds, and wherein the resulting alloys are of a crystalline form.

These and other objects of the present invention are accomplished by providing an improved process for the preparation of a chalcogenide alloy in high purity which comprises providing a solution of alkaline selenium and alkaline tellurium compounds, and subsequently subjecting this solution to an oxidation reaction. In one aspect, the process of the present invention comprises the formation of a solution by mixing alkaline derivatives of selenium and alkaline derivatives of tellurium compounds, followed by subjecting this solution to an oxidation reaction, and thereafter isolating the desired product therefrom. In an important aspect of the present invention, the process comprises the preparation of chalcogenide alloys in high purity comprising providing a solution of alkaline selenium and alkaline tellurium compounds wherein the selenium and tellurium are of a $-2$ valency, and subsequently subjecting this solution to an oxidation reaction thereby enabling the generation of selenium tellurium alloys wherein the selenium and tellurium have a valency of 0.

DESCRIPTION OF THE PREFERRED EMBODIMENTS

The process of the present invention comprises subjecting a mixture of a solution of alkaline selenium and alkaline tellurium compounds to an oxidation reaction for the purposes of obtaining an alloy of the desired composition and of high purity. The oxidation reaction is achievable by, for example, adding a number of oxidizing agents to the aforementioned solution, including hydrogen peroxide, peracids, air sparging, and the like. By oxidation in accordance with the process of the present invention is meant that the appropriate mixture of alkaline selenium and alkaline tellurium compounds are simultaneously oxidized by the addition of a common oxidizing agent. These oxidizing agents include those illustrated hereinbefore with hydrogen peroxide being preferred.

An illustrative reaction process scheme embodiment of the present invention is as follows:

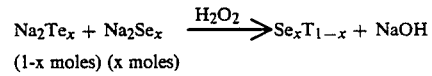

$$Na_2Te_x + Na_2Se_x \xrightarrow{H_2O_2} Se_xT_{1-x} + NaOH$$
(1-x moles) (x moles)

wherein x represents a number of less than 1.

The solution mixture of alkaline selenium and alkaline tellurium compounds can be prepared by a number of suitable methods, which include mixing the appropriate components with an alcohol, a diol, or water followed by a slight warming at a temperature to enable formulation of a desired solution, this temperature being from about 60° to about 80° C. Examples of aliphatic diols selected for the solution process are ethylene glycol, 1,2- or 1,3-propane diol, propylene glycol, butylene glycol, 1,2-; 1,3- or 1,4-butane diols, analogous hexane diols, and the like; with ethylene glycol being preferred. Alcohols that may be selected include, for example, aliphatic alcohols such as methanol, ethanol, propanol, butanol, and the like.

Illustrative examples of alkaline selenium and alkaline tellurium compounds selected include sodium selenide, potassium selenide, sodium telluride, calcium telluride, potassium telluride, and the like. Preferred components selected, which components in accordance with the process of the present invention are in solution, include sodium selenide and sodium telluride. These compounds are commercially available from many sources such as Fisher Scientific, Alpha Products, and are generally of a purity of from about 98 to about 99.9 percent.

In one illustrative oxidation sequence, an oxidizing agent such as hydrogen peroxide is added dropwise to a solution mixture of the alkaline selenium and alkaline tellurium compounds until conversion to the chalcogenide alloys is completed as evidenced by, for example, no further formation of black precipitates. This usually occurs in a period of from about 10 minutes to about 45 minutes, however, this time period can be greater or less depending on, for example, the amount of alkaline intermediates that is dissolved, the reduction temperature, and the oxidizing agents used.

Thereafter, the resulting chalcogenide alloy can be filtered from the reaction mixture washed with a suitable solvent such as an aliphatic alcohol, a diol, or water. Subsequently, the alloy is allowed to dry. There results alloys of 99.99 percent purity subsequent to completion of the oxidation reaction as determined by optical emission spectroscopy. Thus, for example, a binary alloy of selenium tellurium containing a ratio of 4 parts of selenium to 1 part of tellurium prepared in accordance with the process of the present invention contains undetectable impurities such as aluminum, arsenic, boron, barium, bismuth, calcium, cadmium, cobalt, chromium, mercury, manganese, molibdium, nickel, lead, antimony, tin, titanium, thallium, and zinc, with the remainder of the composition being selenium and tellurium as determined by optical emission spectroscopy.

Also, the oxidation reaction can be accomplished at various suitable temperatures dependent on, for example, the oxidizing agent selected and the solvent system used. Generally, the oxidation reaction is accomplished at relatively low temperatures not exceeding about 120° C. Specifically, the oxidation reaction temperature can range from about 25° C. to about 100° C. depending, for example, on the oxidizing agent and solvent employed.

The amount of oxidizing agent needed is dependent on a number of factors such as its chemical composition, reaction temperatures, concentration of reactants selected, and the like. Thus, for example, hydrogen peroxide is usually added in an equimolar quantity until completion of the oxidation reaction, while oxygen rich air is generally bubbled through the solution of the alkaline intermediate selected for a period of time to cause complete precipitation of the chalcogenide alloys.

Specific illustrative examples of alloys prepared in accordance with the process of the present invention include selenium tellurium alloys of the formula $Se_x Te_{100-x}$ wherein x is a number of from about 1 to about 90, and preferably from about 5 to about 30. Examples of specific alloys that can be prepared include $Se_{94.8} Te_{5.2}$; $Se_{91} Te_9$; $Se_{74.1} Te_{25.9}$ and $Se_{71} Te_{29}$.

With further specific reference to a specific process embodiment of the present invention, there is selected from about 10 grams to about 100 grams of the alkaline selenium and alkaline tellurium compounds, and from about 50 milliliters to about 250 milliliters of a glycol or alcohol to enable the formulation of an alkaline selenium, alkaline tellurium solution. Subsequent to stirring, there is added to the solution as indicated hereinbefore an oxidizing agent such as hydrogen peroxide in an amount of from about 50 milliliters to about 500 milliliters, and preferably from about 40 milliliters to about 400 milliliters. Thereafer, the oxidation reaction is accomplished generally at a temperature not exceeding 120° C., and there results the chalcogenide alloys, particularly the selenium tellurium alloys mentioned herein, and an alkaline hydroxide. The aforementioned alloy products were substantially pure, crystalline, and fairly homogeneous as determined by optical emission spectroscopy (OES), scanning electron microscopy (SEM), energy dispersive X-ray analysis (EDXA), X-ray diffraction (XRD), and differential scanning calorimetry (DSC).

The alloys prepared in accordance with the process of the present invention can be formulated into imaging members by, for example, depositing these alloys on a suitable conductive substrate such as aluminum. The resulting imaging or photoconductive member can then be incorporated into an electrophotographic imaging apparatus such as a xerographic imaging apparatus wherein the imaging member is charged to a suitable polarity, followed by subsequently developing the resulting latent image with a toner composition comprised of resin particles and pigment particles, thereafter transferring the developed image to a suitable substrate such as paper, and optionally permanently affixing the image thereto. Furthermore, the alloys prepared in accordance with the process of the present invention can be utilized in layered photoresponsive devices as the photogenerating layer. These devices usually consist of a conductive substrate, a photogenerating layer, and a transport layer, reference U.S. Pat. No. 4,265,990, the disclosure which is totally incorporated herein by reference.

The following examples specifically defining preferred embodiments of the present invention are provided, which examples are not intended to limit the scope of the present invention, it being noted that various alternative parameters which are not specifically mentioned are included within the scope of the present invention. Parts and percentages are by weight unless otherwise indicated.

EXAMPLE I

There was prepared in a 250 milliliter Erlenmeyer flask a solution mixture by dissolving 8 grams of sodium selenide, and 3 grams of sodium telluride in 50 milliliters of ethylene glycol with stirring and slight warming to 65° C. on a magnetic stirrer. Subsequent to the formation of a clear solution, there was added in a dropwise manner to the mixture a solution of 30 milliliters of hydrogen peroxide (30 percent concentration). An exothermic reaction ensued. The black slurry that was formed was then stirred for 45 minutes, cooled to room temperature, and filtered. The black powder resulting was then washed with ethanol, 60 milliliters (3×20 milliliters) portions of ethylene glycol, followed by washing with 100 milliliters (4×25 milliliters) portions of water, dried and weighed. There was obtained 6.1 grams of a crystalline and homogeneous alloy product $Se_{91} Te_9$, the composition of which can be determined by spectroscopic analysis.

EXAMPLE II

There was prepared a selenium tellurium alloy by repeating the procedure of Example I with the exception that there was selected potassium selenide and potassium telluride in place of the sodium selenide and sodium telluride; and there was obtained a selenium tellurium alloy of the formula $Se_{87.1}Te_{12.9}$, which alloy was crystalline and homogeneous.

EXAMPLE III

There was prepared a selenium tellurium alloy by repeating the procedure of Example I with the exception that there was selected as the oxidizing agent air, and there was obtained a selenium tellurium alloy of the formula $Se_{11.3}Te_{88.5}$, which alloy is crystalline and homogeneous.

Other modifications of the present invention will occur to those skilled in the art subsequent to a review of the present application, and these modifications including equivalents thereof are intended to be included within the scope of the present invention.

What is claimed is:

1. A process for the preparation of homogeneous crystalline chalcogenide alloys which comprises providing a solution mixture of alkaline selenium and alkaline tellurium compounds, and subsequently subjecting this mixture to a simultaneous oxidation reaction.

2. A process in accordance with claim 1 wherein the alkaline component is selected from the group consisting of sodium, potassium and calcium.

3. A process in accordance with claim 1 wherein sodium selenide and sodium telluride are selected.

4. A process in accordance with claim 1 wherein a solution mixture of sodium selenide and sodium telluride are subjected to an oxidation reaction with hydrogen peroxide.

5. A process in accordance with claim 1 wherein there is selected for the oxidation reaction a component selected from hydrogen peroxide, air, and peracids.

6. A process in accordance with claim 1 wherein there is selected from about 10 grams to about 100 grams of the alkaline selenium and alkaline tellurium compounds.

7. A process in accordance with claim 5 wherein there is selected for the oxidation reaction from about 30 milliliters to about 500 milliliters of an oxidizing agent.

8. A process in accordance with claim 1 wherein the oxidation reaction is accomplished at a temperature of from about 25° C. to about 120° C.

9. A process in accordance with claim 1 wherein the solution is formulated with a solvent selected from the group consisting of aliphatic alcohols and glycols.

10. A process in accordance with claim 9 wherein the solvent is ethylene glycol.

11. A process in accordance with claim 9 wherein the solvent is propylene glycol.

12. A process in accordance with claim 9 wherein the solvent is methanol.

13. A process in accordance with claim 1 wherein there results the selenium tellurium alloy $Se_{91}Te_9$.

14. A process in accordance with claim 1 wherein there results an alloy of the formula $Se_{87.1}Te_{12.9}$.

15. A process in accordance with claim 1 wherein the oxidation reaction is represented by the following reaction scheme

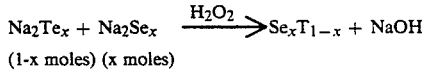

$$Na_2Te_x + Na_2Se_x \xrightarrow{H_2O_2} Se_xT_{1-x} + NaOH$$
(1-x moles) (x moles)

wherein x represents a number of less than 1.

16. A process in accordance with claim 1 wherein the solution is formulated with water.

17. A process in accordance with claim 1 wherein the selenium and tellurium possess a valency of −2 prior to oxidation and a valency of 0 subsequent to oxidation.

18. A process in accordance with claim 1 wherein there results an alloy of the formula $Se_xTe_{1-x}$, wherein x represents a number of less than 1.

19. A process in accordance with claim 1 wherein there results an alloy of the formula $Se_xTe_{100-x}$, wherein x represents a number of from 1 to about 90.

20. A process in accordance with claim 1 wherein there results an alloy of the formula $Se_xTe_{100-x}$, wherein x represents a number of from about 5 to about 30.

* * * * *